United States Patent [19]
Borgwardt et al.

[11] Patent Number: 5,949,490
[45] Date of Patent: Sep. 7, 1999

[54] DISTRIBUTING VIDEO BUFFER RATE CONTROL OVER A PARALLEL COMPRESSION ARCHITECTURE

[75] Inventors: Peter A. Borgwardt, Portland, Oreg.; Caspar Horne, Santa Clara, Calif.

[73] Assignee: Tektronix, Inc., Wilsonville, Oreg.

[21] Appl. No.: 08/889,561

[22] Filed: Jul. 8, 1997

[51] Int. Cl.$^6$ ..................................................... H04N 7/50
[52] U.S. Cl. ........................ 348/419; 348/390; 348/404; 348/405
[58] Field of Search ................................... 348/390, 404, 348/405, 407, 419; H04N 7/50

[56] References Cited

U.S. PATENT DOCUMENTS

| | | | |
|---|---|---|---|
| 5,686,964 | 11/1997 | Tabatabai | 348/420 |
| 5,781,237 | 7/1998 | Fukuda | 348/405 |
| 5,838,834 | 11/1998 | Saito | 348/405 |

*Primary Examiner*—Howard Britton
*Attorney, Agent, or Firm*—Francis I. Gray

[57] ABSTRACT

An algorithm for distributing video buffer rate control over a parallel compression architecture uses parallel processors to first compute complexity measures for each macroblock of a current picture. Based upon the complexity measures a master controller determines target rates for each slice of the current picture. A set of slices are then encoded in parallel by the parallel processors acting as microrate controllers, each slice being encoded based solely upon its own target rate. After the set of slices are encoded, the target rates are adjusted for the remaining slices based upon the actual rates from the encoded slices, and the next set of slices is encoded in parallel based upon the updated target rates. After each macroblock within a slice is encoded, a VBV fullness check is made to detect if VBV overflow or underflow is likely to occur. In such an event emergency action is taken to prevent such overflow or underflow. In this manner message passing overhead between the master controller and parallel processors is minimized while retaining the benefits of parallel processing.

2 Claims, 5 Drawing Sheets

FIG.6 MASTER CONTROLLER

DISTRIBUTING VIDEO BUFFER RATE CONTROL OVER A PARALLEL COMPRESSION ARCHITECTURE

BACKGROUND OF THE INVENTION

The present invention relates to data compression, and more particularly to distributing video buffer rate control over a parallel compression architecture for a video compression system.

In a conventional frame-based compression encoder algorithm, as shown in FIG. 1, video to be compressed is input in viewing order to a preprocessor, which combines the interlaced fields into frames and reorders the frames for compression based upon the particular compression algorithm, as shown in FIG. 2. The frames in processing order are input to a motion detector which generates motion vectors for each macroblock of a current frame being processed, the motion vectors being provided to an output multiplexer as well as to a predictor module. A predicted frame from the predictor module is compared with the current frame, and the differences are transform coded, typically by a discrete cosine transform module. The resulting transform coefficients are then quantized and variable length encoded before being input to the output multiplexer. The output of the multiplexer includes the coded quantized transform coefficients and associated motion vectors for each macroblock of the current frame.

The output of the quantizer is input to an inverse quantizer and then to an inverse transform coder before being added to the predicted frame to reproduce the current frame for storage in the predictor. The predictor then applies the motion vectors for the next frame to the stored current frame to produce the predicted frame for the next frame. For constant rate applications, i.e., where the number of bits at the output is held to a constant rate, a rate controller as described below is used to change the quantization levels for the quantizer on a frame by frame and macroblock by macroblock basis.

It is common in video compression systems as described above, such as MPEG1 and MPEG2, to use the rate controller to constrain the number of bits needed to represent a compressed image by changing the quality of the compressed image, i.e., a quantizer scale factor. It is often typical for the rate controller to observe $R(n-1)$, the number of bits consumed by the video sequence prior to macroblock n, as provided at the output of the variable length encoder, and then to select the quantizer scale factor $Q(n)$ for the n-th macroblock. $Q(n)$ is used to scale the discrete cosine transform (DCT) coefficients in macroblock n so that when the coefficients are coded and put into an output buffer, the value of $R(n)$ is still reasonably close to its pre-allocated target. Examples of this prior art are described in the paper "Scene Adaptive Coder" by Chen and Pratt in *IEEE Trans. Communications*, March 1984, and also in the MPEG2 *Test Model* 3 (Draft) by the Test Model Editing Committee, International Organization for Standardization ISO/IEC/JTC1/SC22/WG11, December 1992. The latter document, for example, checks the buffer fullness status $B(n-1)$ after the previous block and then computes the quality factor $Q(n)$ through the linear relation $$Q(n)=K_R * B(n-1),$$

where $K_R$ is a constant that depends on the targeted average bit rate R. This $Q(n)$ may be further scaled based on the visual complexity of the macroblock being coded, as described in U.S. Pat. No. 5,686,964, entitled "Bit Rate Control Mechanism for Digital Image and Video Data Compression."

Additionally one of the requirements in MPEG for generating a correctly coded bit stream is that a Video Buffering Verifier (VBV) is not violated. The VBV is a hypothetical decoder, described in ISO/IEC 13818-2 Annex C, that is conceptually connected to the output of an MPEG encoder. The VBV has an input buffer, known as the VBV buffer, of size $B_{max}$ bits. The target rate $R(n)$ may have to be adjusted so as not to overflow or underflow the VBV buffer. The occupancy of the VBV buffer for a constant bit-rate operation of MPEG is shown in FIG. 3 where the VBV buffer occupancy B is updated recursively as follows: If $Ba(n-1)$ is the buffer occupancy right after decoding picture $(n-1)$, the buffer occupancy just before decoding picture n, $Bb(n)$, is given by $$Bb(n)=Ba(n-1)+R,$$

where R is average bits per picture; and the occupancy $Ba(n)$ just after decoding picture n is given by $$Ba(n)=Bb(n)-R(n),$$

where $R(n)$ is the bits actually used for picture n. The relationship between the number of bits per picture $R(n)$ and quality factor $Q(n)$ described above may be used by an MPEG video encoder to:

(1) maintain the constraints imposed by the VBV;
(2) keep the VBV buffer occupancy operating point centered;
(3) enable VBV buffer occupancy terminal conditions to be achieved; and
(4) predict and avoid any potential VBV overflow and underflow condition.

The overall rate control mechanism with VBV buffer consideration is shown in FIG. 4.

In a parallel implementation of a compression encoder, where as shown in FIG. 5 a master controller is coupled to a bus together with a video source, a storage medium and a plurality of client processors, the above techniques suffer from an overly centralized control. This leads to delays due to the overhead of passing messages between the parallel client processors, thus slowing down the system to cancel out the potential speedups due to the use of parallel processors. In particular suppose the compression encoder splits each picture between k parallel processors with each processor compressing non-overlapping slices of the picture as shown in FIG. 6, where a slice is defined to be any horizontally contiguous row of macroblocks no more than one macroblock in height. Each slice may be compressed independently of the other slices with the resulting bit streams being concatenated, i.e., the slices are independent except for the rate control calculations and VBV buffer checks described above. Maintaining the rate controller as above requires that the k processors exchange messages with a central rate controller process before and after encoding each macroblock. In most parallel processing architectures this amount of message passing is too large an overhead on the system and unduly slows down the computations.

What is desired is a compression architecture that distributes video buffer rate control over parallel processors without imposing too large an overhead on the system.

BRIEF SUMMARY OF THE INVENTION

Accordingly the present invention provides for distributing video buffer rate control over a parallel compression architecture using a three pass algorithm for each picture within a group of pictures. In a first pass parallel processors compute complexity measures for all the macroblocks in the entire picture so that a central rate controller knows all of them before the encoding of the picture begins. In a second pass the central rate controller divides up a target bit rate for the entire picture between slices of the picture to get an initial target bit rate for each slice based upon the complexities of the contained macroblocks. In a third pass each slice is sent to a parallel processor for encoding, using a micro rate controller that computes the value of Q(n) for each macroblock based solely on knowledge from within the slice, namely the initial target rate for the slice $R_S$, the buffer fullness $B_S$ that exists when the slice is given to the parallel processor by the central rate controller, and the coding of the macroblocks within the slice. When the parallel processor finishes encoding a slice, it checks in with the central rate controller which updates the buffer fullness based on the check-in of all the macroblocks in all the slices that were processed together. A new value of $B_S$ is passed to the parallel processor for the next slice of the picture to be encoded by that processor. Thus the buffer fullness is checked on the granularity of every slice rather than the granularity of every macroblock. The size of the slices is large enough to avoid an overload of messages passing back and forth but small enough to avoid too much inefficiency in the usage of the buffer.

The objects, advantages and other novel features of the present invention are apparent from the following detailed description when read in conjunction with the appended claims and attached drawing.

DETAILED DESCRIPTION OF THE INVENTION

Figure 1:
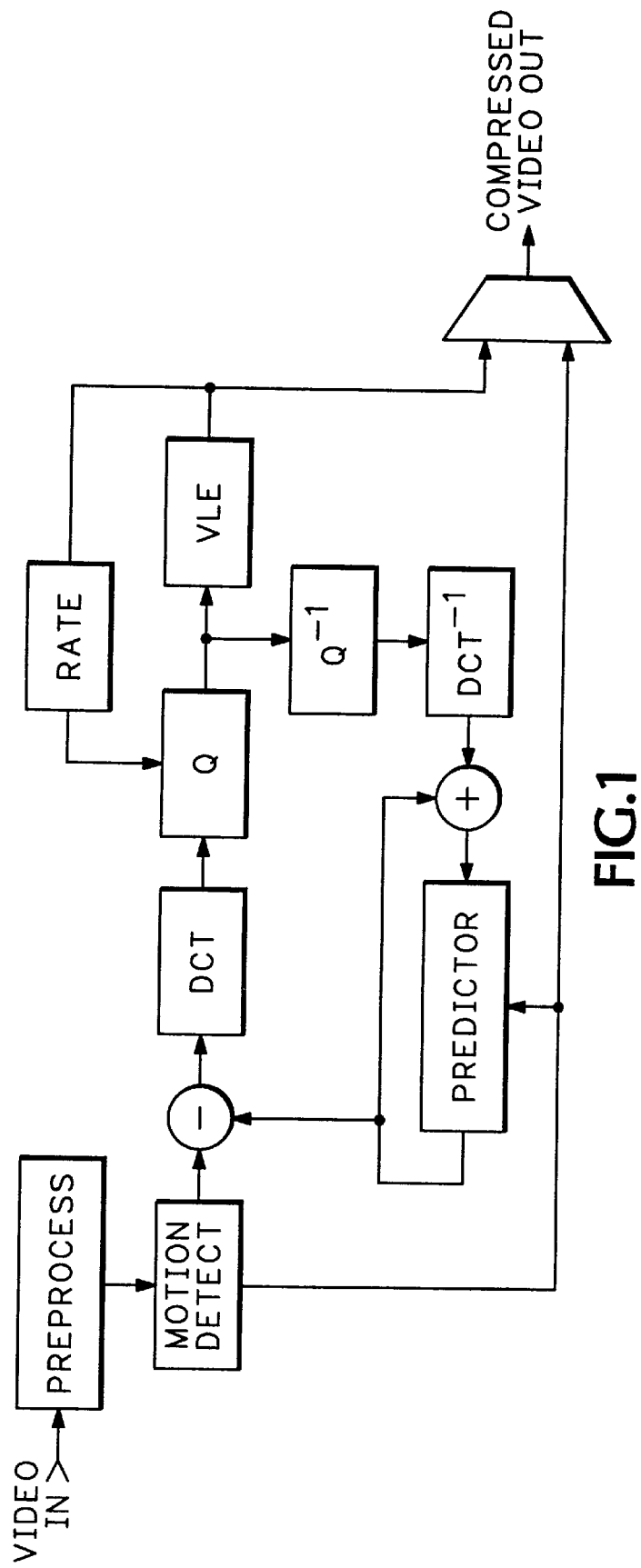
FIG. 1 is a block diagram view of a typical compression encoder.
Figure 2:
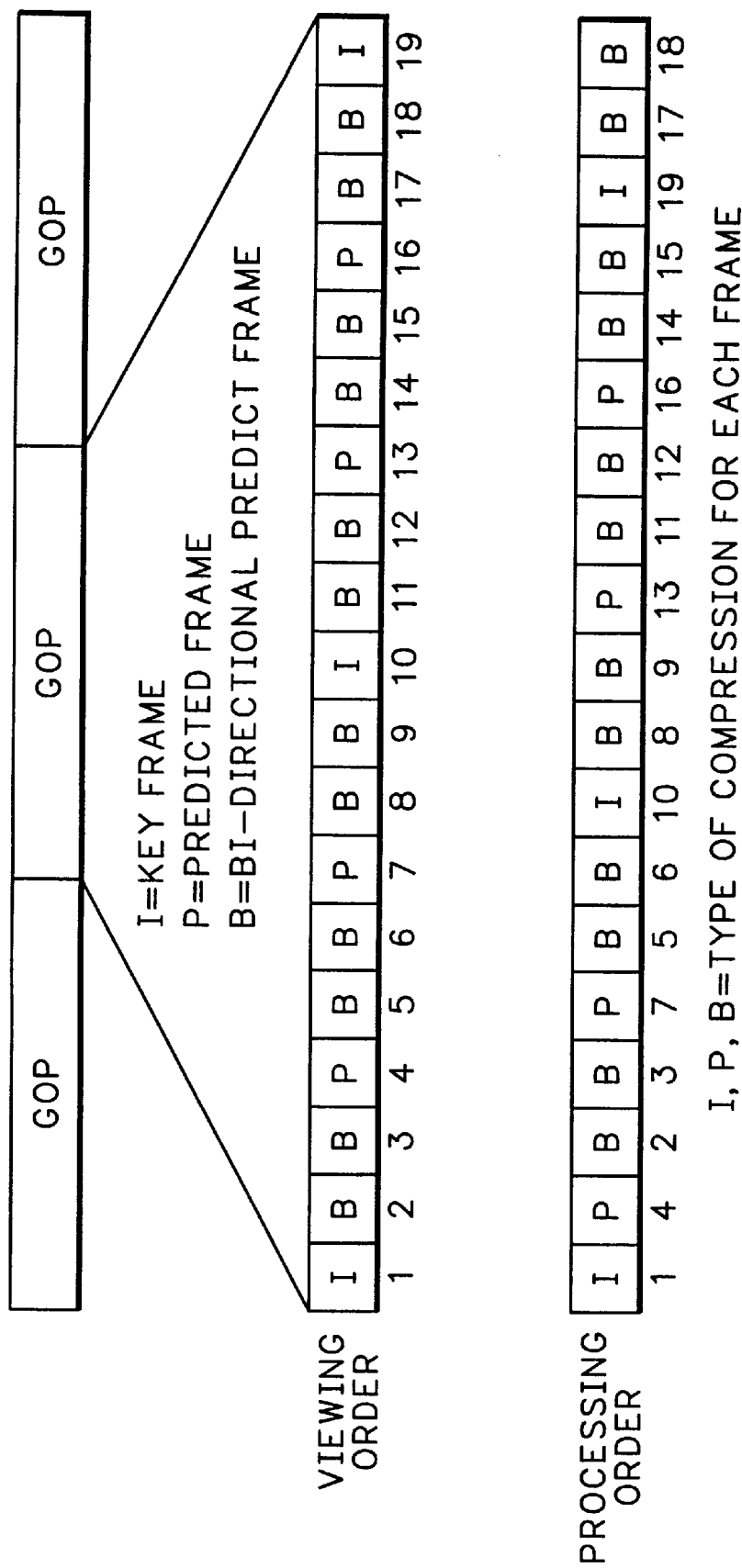
FIG. 2 is an illustrative view of how a video signal is reordered prior to compression.
Figure 3:
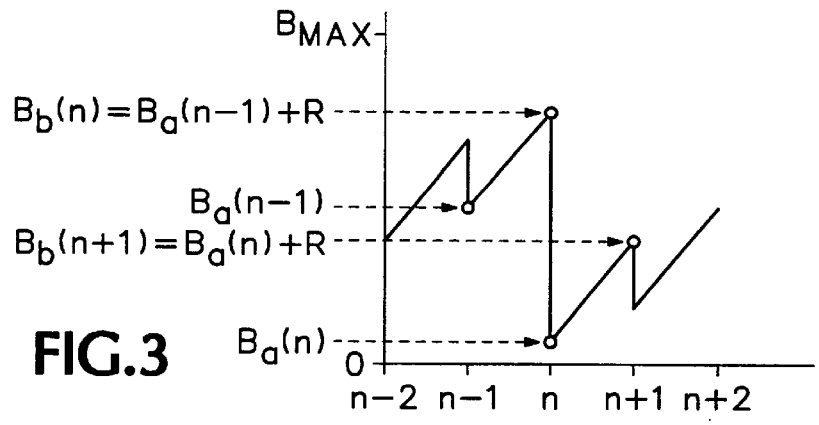
FIG. 3 is a graphic view of VBV buffer occupancy for constant bit-rate operation.
Figure 4:
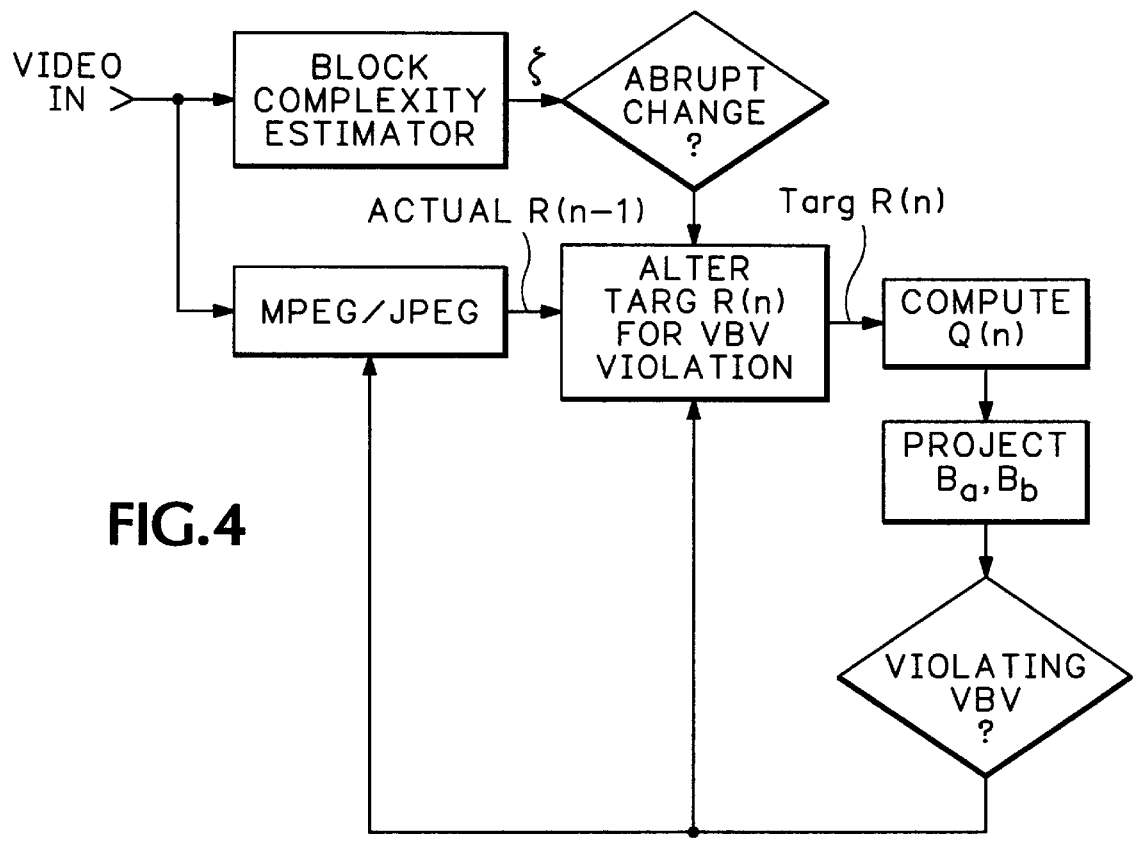
FIG. 4 is a block diagram view of an overall rate control mechanism with VBV buffer considerations.
Figure 5:
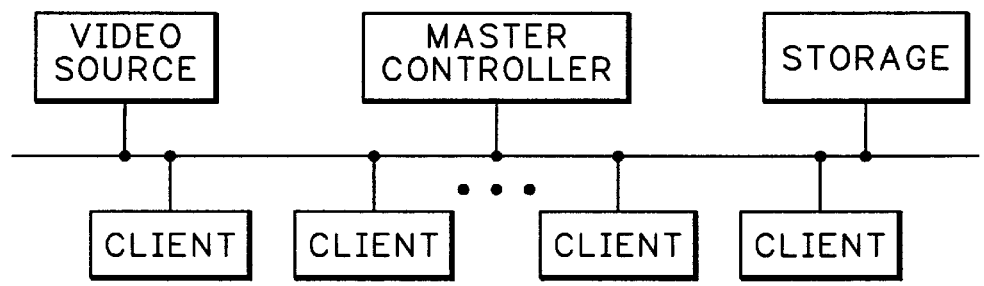
FIG. 5 is a block diagram view of a parallel architecture compression encoder.
Figure 6:
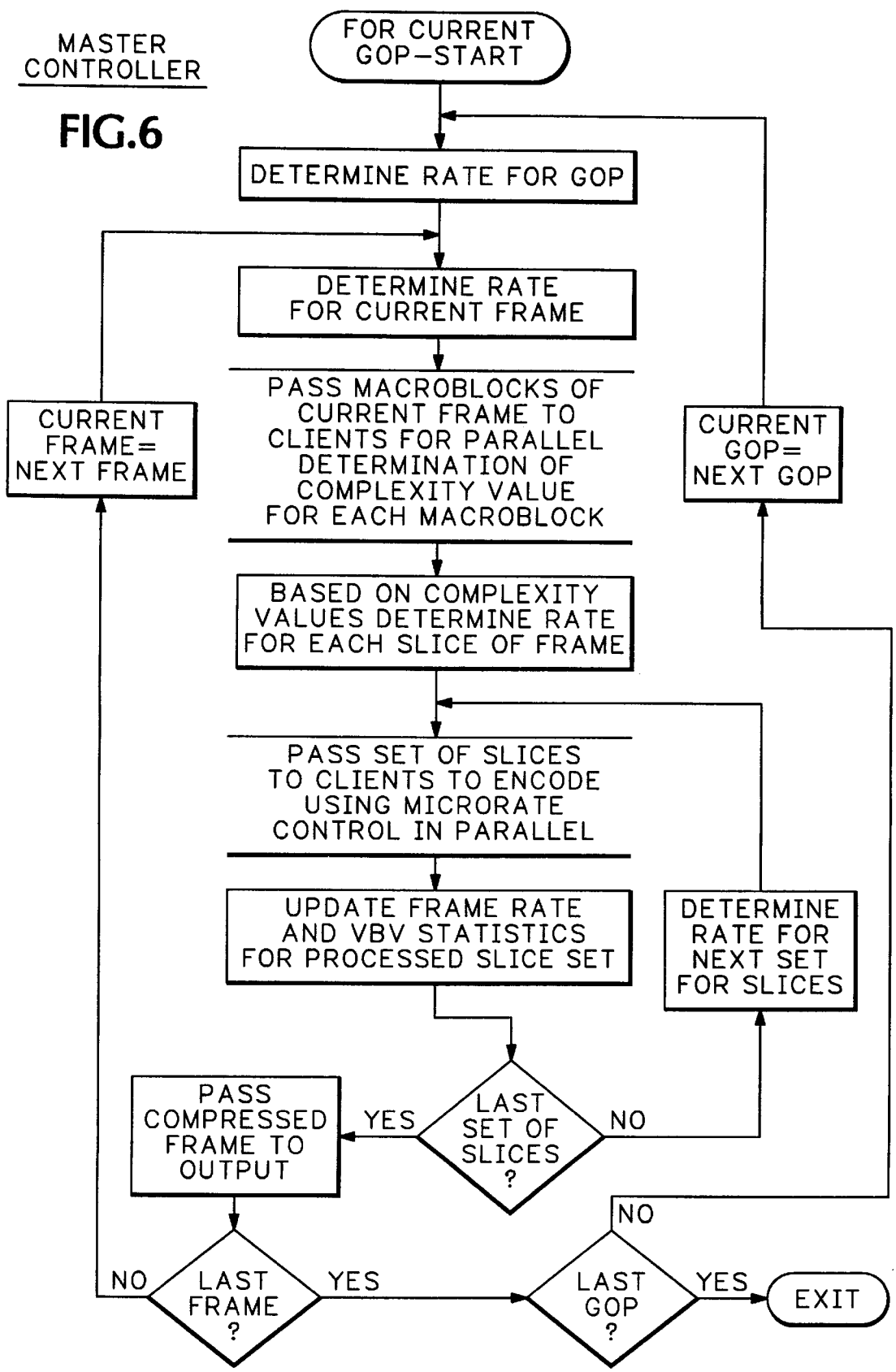
FIG. 6 is a flow chart view of a distributing video buffer rate control algorithm for a master controller over a parallel compression architecture according to the present invention.
Figure 7:
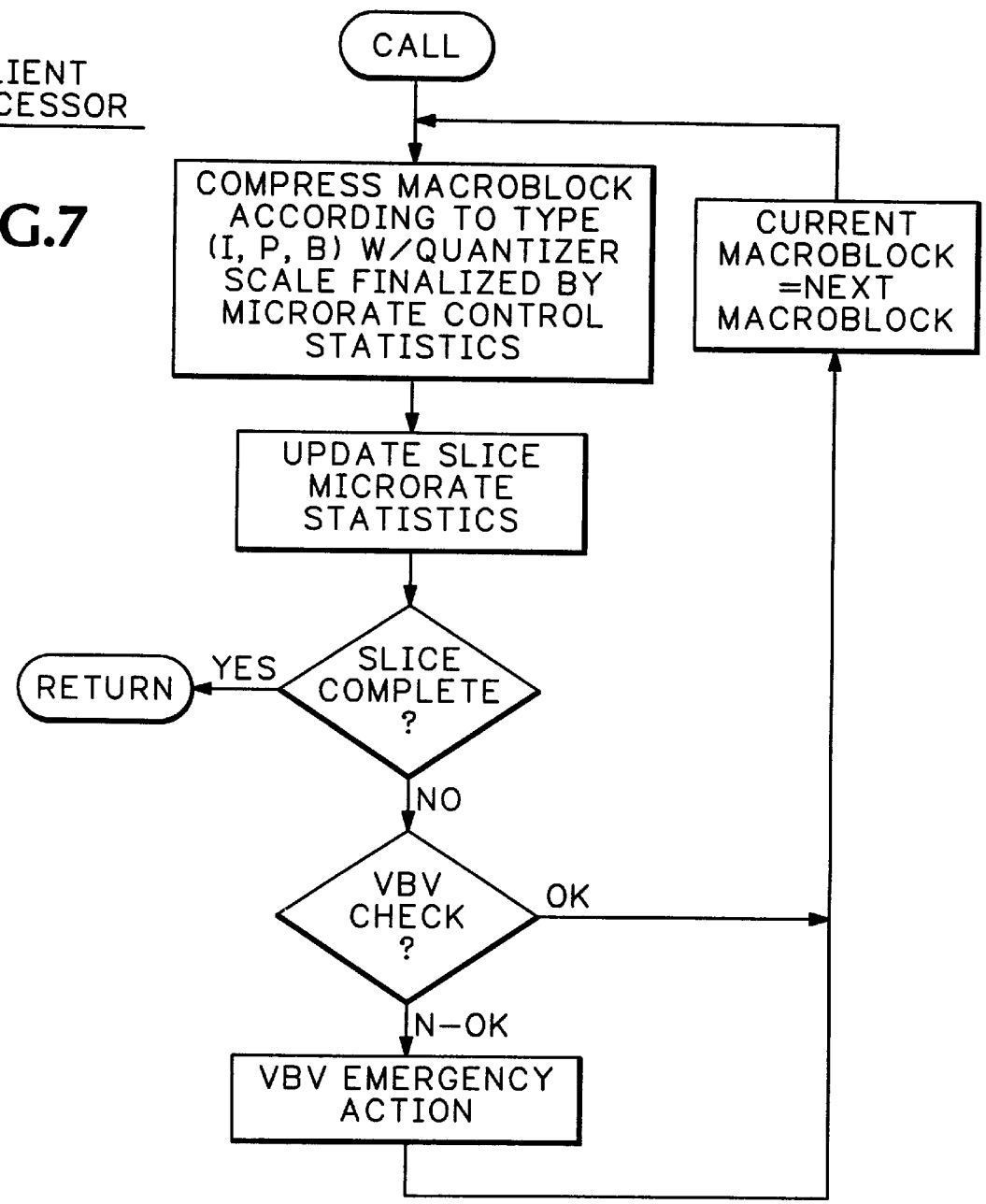
FIG. 7 is a flow chart view of a distributing video buffer rate control algorithm for a client processor according to the present invention.

Referring now to FIGS. 6 and 7 a master rate controller initially determines rate statistics for a current GOP on a picture by picture basis, since I-frames require more bits than P-frames, which in turn require more bits than B-frames. As a result there is a target rate or number of bits R established for each picture in the GOP and an initial quantizer scale factor, Then a current picture in the GOP is processed by initially determining for each macroblock in the current picture and activity or complexity value and a motion vector. This activity or complexity value determination is parceled out by the master rate controller to a plurality of client processors in parallel. For example, for four client processors macroblocks 0–3 would be processed in parallel, then macroblocks 4–7, etc. Based upon the activity values, target rates and quantizer scale factors are determined for each macroblock by the master rate controller. The master rate controller then combines the target rates and quantizer scale factors to provide target rates and quantizer scale factors for each slice of the picture. A set of slices are then transferred to the client processors for encoding in parallel based upon the slice target rates and quantizer scale factors. For example with four client processors slices 0–3 would be processed first in parallel, then slices 4–7, etc. Each slice may correspond to one horizontal section of the picture.

Each client processor acts as a microrate controller and encodes each macroblock in the current slice based upon the target rates and quantizer scale factors passed to it by the master rate controller and the actual target rates and quantizer scale factors for the preceding macroblocks in the slice. Once the encoding of the slice is complete, the statistics for the slice, which include the actual rate or number of bits used and the actual quantizer scale factors, are returned to the master rate controller together with the statistics from the other client processors. These actual statistics from the completed slices are used by the master rate controller to update the target rates and quantizer scale factors for the next set of slices to be passed to the client processors for encoding. This process is repeated until all of the slices have been encoded, at which point the master controller start the cycle over again for the next picture in the GOP, updating the GOP statistics after each picture base upon the actual statistics for the just completed picture.

During the processing of the slices after the encoding of each macroblock a VBV check is made to determine whether there is a danger of either overflow or underflow. Since each set of slices is processed before the statistics for the picture are updated, the bounds for the VBV fullness are set below the maximum and above the minimum values by a specified percentage, such as five percent (5%). If the VBV fullness moves outside the boundaries, then appropriate corrective action is taken to prevent VBV overflow or underflow. Such actions may include forcing the quantizer scale factor to its highest value for overflow conditions, or to its lowest value for underflow conditions, or even zeroing out the DCT coefficients for serious overflow conditions.

Thus the present invention provides distributed video buffer rate control over a parallel compression architecture by dividing a picture into slices, each with its own target rate, and processing sets of slices in parallel using microrate controllers for each slice.

We claim:

1. A method of compressing a current picture from a group of pictures, the current picture being subdivided into a plurality of macroblocks, comprising the steps of:

determining activity measures for each macroblock of the current picture;

determining a target rate for each macroblock of the current picture based upon the determined activity measures;

based upon the macroblock target rates determining a target rate for each slice in the current picture, a slice containing a subset of the macroblocks;

encoding in parallel a set of slices for the current picture, each slice being encoded based solely upon its target rate;

after each set of slices is encoded, updating the target rate for a next set of slices to be encoded; and repeating the encoding and updating steps until all of the slices for the current picture are encoded.

2. The method as recited in claim 1 further comprising the step of:

after the encoding step checking a VBV fullness condition to determine if a buffer overflow or underflow condition is likely; and taking emergency VBV action to prevent the buffer overflow or underflow condition.

* * * * *